United States Patent [19]

Petersen

[11] Patent Number: 4,531,820
[45] Date of Patent: Jul. 30, 1985

[54] ELECTROMAGNETIC ACTUATOR GENERATING EQUAL AND OPPOSING FORCE VECTORS

[75] Inventor: Christian C. Petersen, Westwood, Mass.

[73] Assignee: Polaroid Corporation, Cambridge, Mass.

[21] Appl. No.: 506,787

[22] Filed: Jun. 22, 1983

[51] Int. Cl.³ .............................................. G03B 9/40
[52] U.S. Cl. .................................. 354/234.1; 354/247; 335/222
[58] Field of Search ................. 354/234.1, 235.1, 246, 354/247, 271.1; 310/27, 36; 335/222, 223, 224, 225, 226

[56] References Cited

U.S. PATENT DOCUMENTS

| | | | |
|---|---|---|---|
| 3,056,341 | 10/1962 | Grey | 354/456 |
| 3,455,219 | 7/1969 | Burgarella | 354/451 |
| 3,781,099 | 12/1973 | Williams et al. | 352/141 |
| 3,782,255 | 1/1974 | Boerner | 354/454 |
| 3,882,522 | 5/1975 | Erlichman | 354/30 |
| 3,942,183 | 3/1976 | Whiteside | 354/29 |
| 4,024,552 | 5/1977 | Kondo | 354/234.1 |
| 4,121,235 | 10/1978 | Fujita et al. | 354/234.1 |
| 4,265,530 | 5/1981 | Petersen | 354/235 |
| 4,333,722 | 6/1982 | Lee | 354/234.1 |
| 4,338,009 | 7/1982 | Lee | 354/152 |
| 4,343,239 | 8/1982 | Seifert | 101/93.34 |
| 4,348,092 | 9/1982 | Hirohata et al. | 354/230 |
| 4,348,094 | 9/1982 | Hirohata et al. | 354/234.1 |
| 4,349,264 | 9/1982 | Tezuka et al. | 354/234.1 |
| 4,390,262 | 6/1983 | Hirohata et al. | 354/230 |
| 4,408,858 | 11/1983 | Lee | 354/271.1 |

*Primary Examiner*—A. A. Mathews
*Attorney, Agent, or Firm*—Leslie J. Payne

[57] ABSTRACT

An electromagnetic actuator is disclosed which develops generally equal and opposing force vectors acting on an armature. This is done by constructing and arranging a permanent magnet assembly, the armature and a conductor assembly to achieve the foregoing results.

10 Claims, 2 Drawing Figures

FIG. I

ELECTROMAGNETIC ACTUATOR GENERATING EQUAL AND OPPOSING FORCE VECTORS

BACKGROUND OF THE INVENTION

This invention relates generally to electromagnetic actuators and, in particular, electromagnetic actuators for driving blade mechanisms usable for exposure control purposes.

A wide variety of actuators have been used for driving shutter mechanisms in cameras. Typically, these tend to be mechanically sophisticated in construction and operation. Ordinarily, shutter blades are rotated, pivoted or generally linearly reciprocated for purposes of controlling the passage of scene light along an optical path which intersects the blades. U.S. Pat. Nos. 3,781,099; 3,782,255; and 3,942,183 are illustrative of different kinds of shutter blade arrangements. Many known kinds of shutter blade mechanisms include a stored energy device, in the form of a mechanically tensioned spring, for driving the blades to an open or closed condition. While they function satisfactorily and provide commercially acceptable reliability, nonetheless, they have certain limitations. As is apparent, sophisticated shutter mechanisms are of intricate construction and, therefore, are relative costly and difficult to manufacture. Moreover, with the use of spring mechanisms the performance characteristics are relatively fixed. This is disadvantageous since their performance characteristics cannot be programmable. Aside from this, the spring biased shutters have dynamic performance characteristics which are not as accurate or as reliable as they might otherwise be. Besides the foregoing drawbacks, they tend to be relatively large and somewhat bulky. Further, because of their complicated mechanical nature they are relatively susceptible to failure.

Recently, efforts have been undertaken for improving upon such shutter mechanisms. This is not only because of the limitations mentioned above, but also due to the desire to miniaturize cameras. In this connection, the use of relatively large spring tensioned devices for driving shutter blades in miniature cameras is less than entirely suitable.

Some proposals have suggested using electromagnetic actuators for driving the shutter blades. Many conventional electromagnetic actuators for actuating shutters employ annular field coils with magnetic armatures moving into and out of their cores. These are considered too bulky and, therefore, less than ideal for compact shutter mechanisms. U.S. Pat. No. 4,024,552 even discloses shutter blades which form part of the electromagnetic actuator itself for purposes of design simplicity. Despite this compact arrangement, such an actuator nevertheless uses springs for driving the blades to a terminal condition. In fact, a number of electromagnetic shutter mechanisms rely upon springs for driving the blades. Exemplary of such electromagnetic devices are those disclosed in U.S. Pat. Nos. 4,333,722; 4,338,009; and 4,348,092. Moreover, spring mechanisms tend to bias the shutter blades so as to make them dynamically unstable. Therefore, such systems typically employ latches to keep them in a stable at rest condition.

There have been proposals for springless shutter mechanisms. One such proposal is described in commonly-assigned U.S. Pat. No. 3,882,552. This patent discloses use of a rotary stepper motor for driving the shutter blades between open and closed orientations. Rotary stepper motors while being an improvement over the other kinds of conventional motors are still considered somewhat bulky for miniaturization purposes.

Another proposal for a springless type shutter mechanism is described in commonly-assigned U.S. Pat. No. 4,265,530 issued to the inventor of the instant application. This patent describes a system using not only a linear electromagnetic actuator but an electromagnetic clutching mechanism for intermittently transmitting the motive force of the actuator to the shutter blades.

A further proposal for a springless type shutter is disclosed generally in U.S. Pat. No. 4,121,235. This patent essentially discloses an electromagnetic shutter mechanism having a pair of solenoids each with an annular field coil which when actuated or energized actuate a pair of shutter blades interconnected through a force transmitting lever.

SUMMARY OF THE INVENTION

In accordance to the present invention there is provided an electromagnetic actuator comprising an armature assembly. Means are provided for rotatably supporting the assembly for movement about a given axis. Conducting means are operatively associated with either the armature or the supporting means and is electrically energizable. A permanent magnetic arrangement is operatively associated with the other of the assembly or supporting means and is arranged in an adjacent relationship to the conducting means. This arrangement establishes at least a permanent magnetic field extending in the same general direction as the axis and which encompasses at least a portion of the conducting means such that when the latter is energized with a given polarity current the assembly is driven in one direction along the path. The arrangement, the conducting means and the assembly are constructed and arranged with respect to each other so that when the conducting means is energized with a given polarity generally opposing portions of the assembly develop force vectors which are generally equal in magnitude and opposite in direction so as to rotate said assembly.

In an illustrated embodiment, there is provided an apparatus for use in an exposure control system, the apparatus includes the electromagnetic actuator noted above and further includes means for controlling scene radiation by unblocking and blocking an optical path. This controlling means is connected to the assembly of the actuator and is movable in response to the assembly so as to unblock and block scene radiation traveling along the optical path. Such scene radiation control means includes at least a pair of blades, each one of said blades is connected to a respective opposed end portion of the assembly, whereby each of the blades is moved in the same direction as the respective opposed end portion it is connected to.

In such illustrated embodiment, the control means includes a common force transmitting member connected to and between the opposed end portions. The blades are connected thereto, and the control means includes means for defining a path of travel for the transmitting member including a pair of upper and lower flights. These flights extend in respective planes generally parallel to the assembly. Each of the blades is connected to respective ones of the flights such that both of the blades are arranged to cooperate with each other to selectively unblock and block the optical path during movement of the upper and lower flights. The blades extend in a plane generally transverse to the path of movement of the flights.

In an illustrated embodiment, the actuator includes magnetic arrangement having at least generally diametrically opposed pairs of magnetic fields. Each of the pairs includes fields of adjacent and opposing magnetic polarity extending generally transversely to the path of movement of the assembly. The conducting means includes active conducting portions oriented so as to be generally parallel to the magnetic arrangement. Each of the active conducting portions is associated with a respective one of the fields so that when energized electromagnetic driving forces are generated by each of the conducting portions and respective fields so that the generally equal and opposite force vectors are created to the assembly in the path.

Among the objects of the invention are, therefore, the provision of an improved electromagnetic actuator for developing force vectors of generally equal magnitude and which move in generally opposite directions; the provision of such an electromagnetic actuator having permanent magnets and active conductor portions in spaced and generally parallel relationship to one another; the provision of such an improved electromagnetic actuator for use in driving a blade assembly of the type usable in an exposure control mechanism; the provision of such an improved electromagnetic actuator having an armature assembly which has the blades connected thereto, whereby the blades move in a plane generally parallel to the plane of movement of said armature; the provision of a blade assembly wherein a common force transmitting member interconnects the blades and the armature assembly; the provision of a blade assembly having opposed upper and lower flights to which are connected respective blades which move in a rectilinear fashion along the path of movement of the flights, the provision of a blade assembly wherein the blades extend in a direction generally parallel to the path of movement of the flights; and the provision of an armature and blade assembly arrangement which permits the blades flights to move in a rectilinear fashion.

Other objects and further scope of applicability of the present invention will become apparent from the detailed description to follow when taken in conjunction with the accompanying drawings in which like parts are designated by like reference numerals.

DETAILED DESCRIPTION

Figure 1:
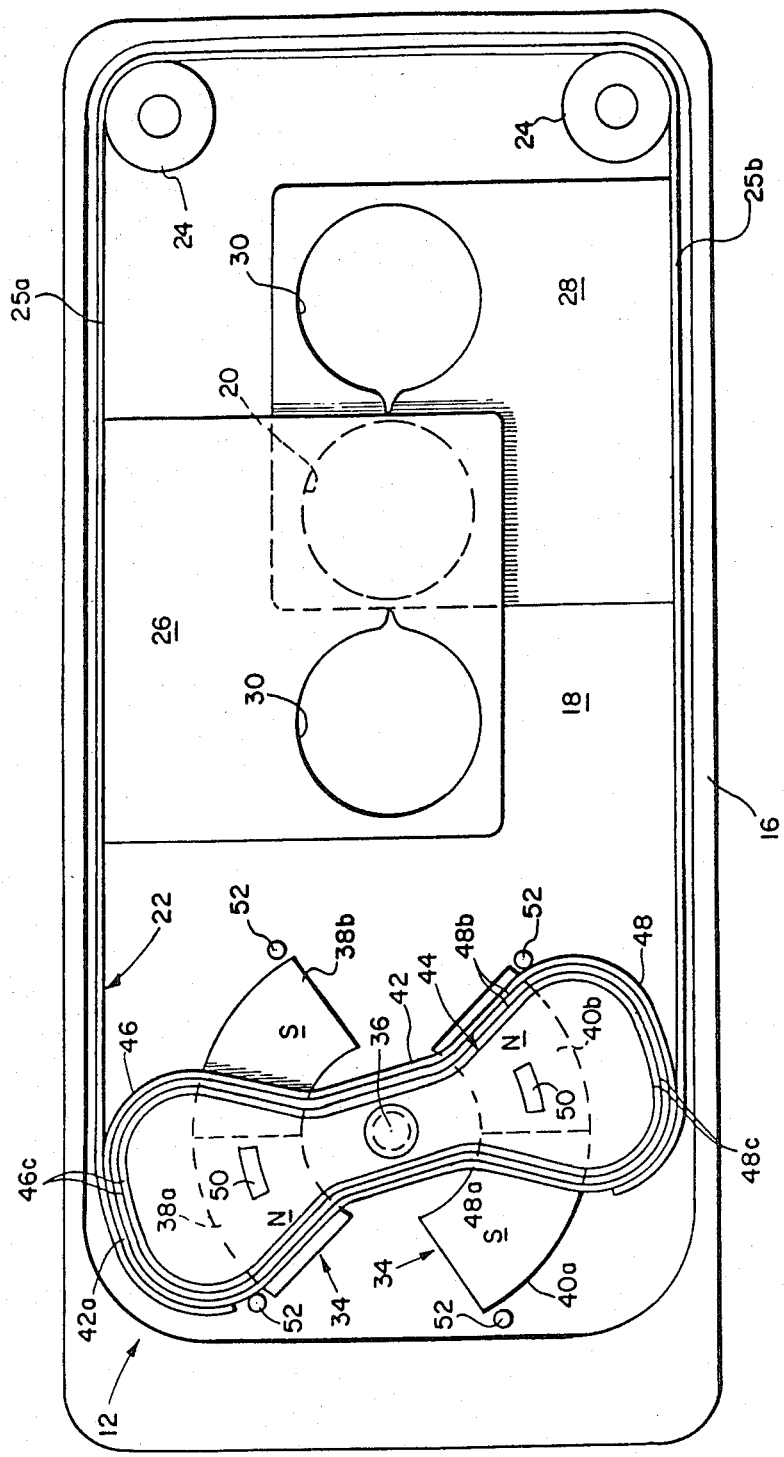
FIG. 1 is a side elevational view showing one embodiment of an electromagnetic actuator of the present invention in one condition of operation.
Figure 2:
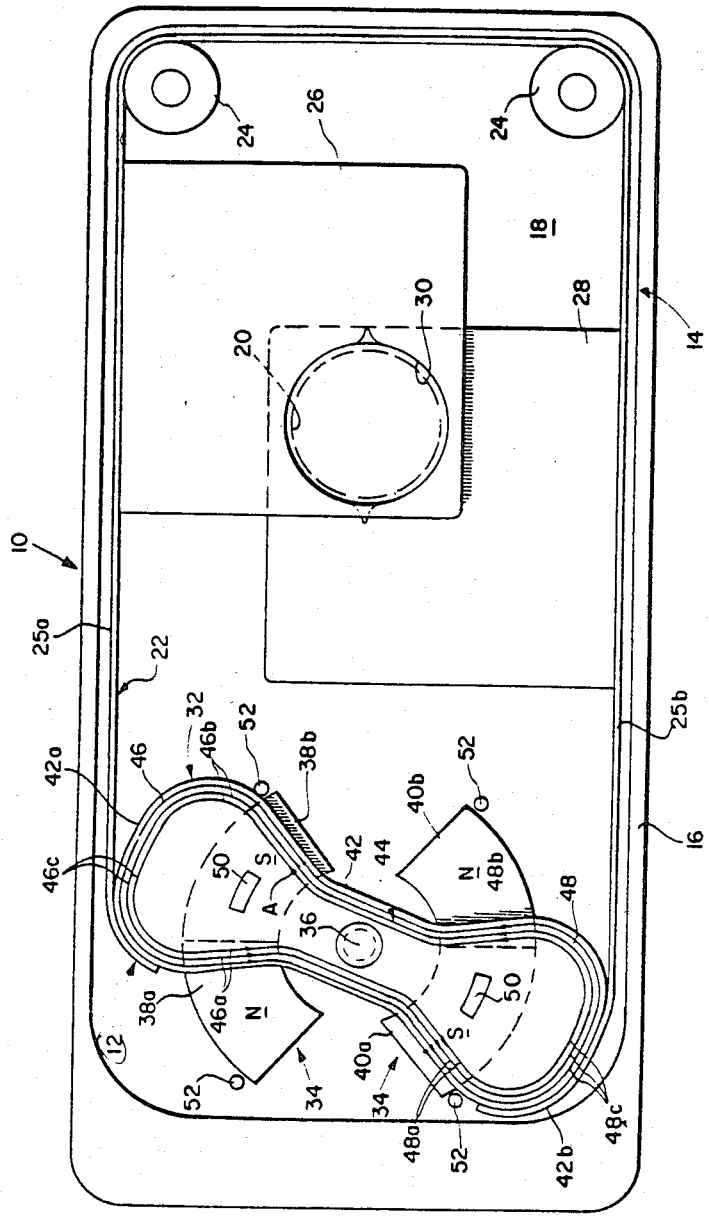
FIG. 2 is a view similar to FIG. 1 but showing the embodiment in a different condition of operation.

Reference is now made to FIGS. 1 and 2 of the drawings for illustrating one preferred embodiment of the present invention. As depicted there is shown a blade mechanism 10 of the so-called scanning type. The present blade mechanism 10 is adapted for use in exposure control purpose for photographic apparatus (not shown). But, it should also be appreciated that the blade mechanism 10 may be used in other apparatus as well. For example, it can be used in machines preparing microfiche.

Included in the blade mechanism 10 is an electromagnetic actuator 12 having coupled thereto an integral blade assembly 14. The former is operable to drive the latter between scene light blocking and unblocking conditions; see FIGS. 1 and 2, respectively. For effecting such blocking and unblocking operations, the electromagnetic actuator 12 is selectively energized in a manner which will be set forth.

There is provided a block casting 16 which is constructed to support components of the blade mechanism 10. Since the block casting 16 will support permanent magnets, it is made of a non-magnetic and non-conducting plastic material having a generally flat planar surface 18 with a light exposure aperture 20 formed therethrough. This light exposure aperture 20 defines the maximum light exposure aperture which permits passage of scene light to a photographic film unit (not shown). Control of exposure by the blade mechanism 10 is effected by an exposure control system. This system is not shown since it does not form an aspect of the instant invention. However, a description of such a system can be had by reference to commonly-assigned U.S. Pat. No. 4,040,072.

In this embodiment, the blade assembly 14 includes an integral thin flexible belt 22 having its opposite distal ends connected to the electromagnetic actuator 12. The integral belt 22 is supported by and moves relative to pairs of spaced apart posts 24 which are attached to the baseblock casting 12. In this regard see FIGS. 1 and 2. These posts 24 serve to define a series of linear flights or runs including generally parallel upper and lower flights 25a,b of the belt 22. Opaque blades 26 and 28 are integrally attached to respective flights 25a,b of the belt 22. Thus, the blades 26, 28 run along generally parallel paths. The blade belt 22 is sufficiently tensioned over the posts 24 so as to assist in providing rectilinear movement of the blades 26 and 28 during movement of the latter. Since the blade belt 22 is flexible, it will generally follow the curved contours of the distal ends of the armature assembly of the electromagnetic actuator 12. As will be explained, this allows for rectilinear movement of the upper and lower flights 25a,b and obviates the need of having a pin/slot arrangement connecting the armature to the belt 22 to achieve the rectilinear movement.

The opaque blades 26, 28 extend generally transversely to the path of movement of the belt flights 25a,b. Thus, the blades 26, 28 move relative to each other in generally parallel planes as well as with respect to the planar surface 18. In this regard, the block casting 16 is formed of a material which permits freely slidable movement of the blades 26, 28 thereupon. When the electromagnetic actuator 12 operates, the blades 26, 28 will be driven in a counter-reciprocatory fashion.

Each of the blades 26, 28 is formed with a generally tear-drop shaped primary aperture 30. These apertures 30 are arranged such that when the blades 26, 28 counter-reciprocate along their respective paths the apertures 30 will progressively coincide over the exposure opening 20 for defining aperture values which vary as a function of blade positioning during exposure. Although the belt 22 is shown as a double-ended type, it is to be understood that an endless belt may be used. In fact, separate belts or blade carrying members may be used. However, the present embodiment has the upper and lower flights interconnected for purposes of insuring instantaneous and simultaneous movement of both blades 26, 28. In this regard, the belt 22 is made of a flexible material. The pushing and pulling forces generated by the actuator 12 will be effectively transmitted, while the transverse flexibility allows the belt 22 to follow the contours of the armature of the electromagnetic actuator 12.

Reference is again made to the electromagnetic actuator 12. As seen, it includes an armature assembly 32 and a permanent magnetic arrangement 34. The armature assembly 32 is suitably mounted on the block casting 16 for rotatable movement in a plane about rotation axis 36.

First referring to the permanent magnetic arrangements 34, it is seen to include opposing pairs of permanent magnets 38a,b; 40a,b; respectively; being suitably connected to the block casting 16 in the symmetrical manner shown. Preferably, these magnets are of the rare earth type, such as samarium cobalt. These magnets have their fields extend in a ballistic manner. In this embodiment, the magnets 38a,b have opposing poles in juxtaposed relationship. More particularly, the permanent magnet 38a has its upper surface with a north pole "N", while the juxtaposed permanent magnet 38b has its upper surface with a south pole "S". These surfaces are generally coplanar and the magnets 38a,b are of equal strength. In connection with the permanent magnets 40a,b they are positioned in a diametrically opposed and generally equally spaced relationship with respect to the permanent magnets 38a,b about the axis 36. In this case, the magnet 40a has its upper surface defining a south pole "S", while the magnet 40b has its upper surface defining a north pole "N". As with the magnets 38a,b, the magnets 40a,b have generally equal strength. Although the present embodiment has described the use of pairs of magnets, it is to be understood that each pair may be replaced by a single magnet being magnetized in such a fashion that it has the polarity like that represented in the drawings. The present invention contemplates that the magnet arrangement 34 can be mounted on the rotatable armature assembly 32 itself and a field coil on or adjacent the casting. If desired, a pair of single polarity magnets may be installed on opposite sides of the axis 36 and being so positioned with respect to the direction of current in a coil that there is generated rotational forces of the kind contemplated by this invention.

Referring back to the armature assembly 32, it includes a generally planar armature member 42 which is made of a suitable non-conducting material and is mounted for rotation in a given path about the axis 36. In this embodiment, the armature 42 is a generally elongated member having opposite end portions 42a,b thereof with a generally arcuate configuration. In particular, the arcuate portions 42a,b have the distal end portions of the belt 22 wrapped and unwrapped therefrom. To insure that the flights and therefore the blades 26, 28 move in a rectilinear fashion the belt is flexible and the arcuate portions 42a,b have a generally constant radius. When the armature rotates, the flexible portion of the belt wraps and unwraps from the arcuate portions in such a manner that they engage or disengage the arcuate portions at a point generally tangent to the radius, whereby the upper and lower flights 25a,b can move in a rectilinear fashion.

Connected to the armature 42 is a generally flat field coil 44. Since the field coil 44 is generally flat, it can be placed in generally closely spaced relationship to the permanent magnets 38a,b; 40a,b. Advantageously, this provides for an extremely thin and compact actuator.

The field coil 44 includes diametrically opposing and generally symmetrical conducting portions 46 and 48. Each of the conducting portions 46, 48 is divided into active portions 46a,b; 48a,b; and inactive conductor portions 46c and 48c. Active portions are those portions which stay within the magnetic field. As illustrated all these portions are formed in a single coil assembly. As will become apparent, this arrangement simplifies the controls necessary for selectively energizing the field coil. The active portions 46a,b will stay continuously within the fields of the permanent magnets 38a,b; respectively. Similarly, the active portions 48a,b will stay continuously within the fields of the permanent magnets 40a,b; respectively. This is so despite the rotational movement of the armature 42 between its extreme positions as shown in the drawings. The permanent magnets 38a,b and 40a,b are shaped so that even though the active portions 46a,b; 48a,b rotate the same length of these portions remain in the respective fields, while the non-active portions 46c, 48c remain out of the fields. Moreover, these active portions will rotate with respect to the magnets so that they are generally perpendicular to lines tangent to the arcuate peripheral surfaces of the magnets. Thus, the resultant driving forces generated are generally at right angles to a radius extending from the axis 36. In this manner, the forces generated will be generally constant throughout the path of movement of the active portions which traverse the fields. The significance of this will be appreciated subsequently.

When the field coil 44 is energized with a given polarity of current controlled by a suitable exposure control mechanism, the same current flows through the entire coil. This is perhaps best indicated by the arrows A. Because the active portions 46a,b; 48a,b are arranged in the manner shown, the current flow in active portions 46a is opposite in direction to that shown in active portion 46b. Likewise, the flow of current in active portions 48a is opposite to that shown in 48b. As a result of this interaction, all the active portions will be effective to rotate the armature member 42 in the same direction with the same force. Although the present embodiment discloses a single field coil, such need not be the case in order to practice the present invention, since more than one coil could be used. Whatever number of coils is used though, the previously described orientation of current is preferred so as to insure that the electromotive forces are the same. Although the present embodiment has shown the use of a coil 44 on the armature 42 itself, it will be appreciated that the magnets 38a,b; 40a,b may be movable relative to a stationary coil arrangement. In this latter regard, the armature 42 itself would carry the permanent magnets.

In the present embodiment, the armature 42 is dynamically balanced. In other words, it has equal mass on opposite sides of the rotation axis 36 so that the inertia characteristics of the opposing sides are equal. Also, the field coil should be similarly constructed and arranged on the armature 42 so as to have the opposing portions with equal mass. Thus, when the equal forces generated as a result of the interaction of the energized active portions and their respective magnetic fields, the force vectors acting through the armature 42 on the respective upper and lower flights will be equal and opposite in direction. This insures that the blades move at the same speed regardless of their angular orientation. Of course, the blades should be of equal mass and the belt 22 should have a uniform mass. Because the opposing positions of the armature member 42 are interconnected, as pointed out by the belt 22, the pushing and pulling forces act in concert to minimize the effect of gravity on the speed of the blades. As a consequence, the blade mechanism 10 can be placed in virtually any orientation with respect to a horizontal plane with the expectation that the blades will move at the same rate.

While the foregoing embodiment discloses a pair of opposed linear type motors for driving the armature member 42, the present invention contemplates that a single motor can be used. When a single actuator is used, the armature member 42 must be constructed so that the vector products of forces pushing and pulling on the upper and lower flights will be equal. For example, if the single actuator was comprised of the permanent magnets 38a,b and the field coil portions 46a,b, the armature member 42 would have its mass unbalanced. In particular, that portion of the armature member 42 which is opposite the permanent magnets 38a,b would be lighter than that in overlying relationship. Also, in this embodiment there is no need for latches for purposes for maintaining the shutter blades in any angular orientation. The reason for this is that the armature member 42 carries opposed ferromagnetic strips 50. Each is magnetized by the permanent magnets such that they serve as a very weak magnetic detent for maintaining the armature member 42 in a stationary position, unless, of course, overcome by the electromagnetic forces generated by the motors. For balancing purposes the strips 50 are symmetrically spaced from the axis 36 and have equal mass. No external bias is required to move the armature member 42, and no latch system is necessary for maintaining the blades in a particular orientation. Stops 52 limit angular movement of the armature 22.

Operation of the blade mechanism 10 is believed apparent from the foregoing description. However, the following brief description is given to supplement the above. For purposes of driving the blades 26, 28 from their blocking to their unblocking orientations as shown in FIG. 2, current of a given polarity is directed by a control circuit (not shown) to the planar field coil 44. For purposes of illustration only, the direction of the current in this particular mode is indicated by the arrows A. As a consequence, the active conductor portions 46a interact with the north N magnetic pole of the permanent magnet 38a so as to create a clockwise driving force on the armature member 42. This clockwise driving force is reinforced by the interaction of the active conductor coil portions 46b with the south S field of the permanent magnet 38b. Similarly, the current flowing through the active conductor portions 48a,b cooperate with the magnetic fields of their respective magnets 40a,b to also drive the armature 42 in the clockwise direction. To drive the armature 42 in the opposite direction, of course, the field coil 44 is energized with opposite polarity. Since there is a dynamic balance created as noted above, the blades 26, 28 can reciprocate along their paths in a manner consistent with their preprogrammed movement for exposure control purposes. Since the blades 26, 28, the belt 22 and the armature member 42 are tied together as an integral unit as noted the vector of the forces created by the opposing motors are equal and opposite. Thus, the upper flight will be pushed with the same force as the lower flight is pulled, when both flights are in a generally horizontal orientation. When the flights are at an angle to the horizontal, obviously gravity will to a degree affect movement of both flights and blades. For example, when the upper blade 26 would be inclined with respect to the horizontal so that the motors are above the blades, gravity will tend to cause the blade 26 to move faster than desired when the blade is pushed rightwardly (downwardly). Likewise, the lower blade will move slower than desired because it moves against gravity when pulled leftwardly (upwardly). Thus, the desired blade speed would be affected adversely. However, since the two blades 26, 28 are tied together and the equal and opposite forces of the actuator 12 are acting on them, the effect of gravity is neutralized since the effect of gravity on the upper blade 26 moving downwardly is also pushing against the lower blade 28 moving upwardly by means of the belt 22. As a result, the blades 26, 28 will correspondingly traverse along the paths defined earlier at a rate which is almost the desired rate regardless of angular orientation.

Although the present embodiment has described the use of a separate but integral blade assembly, it should be readily understood that the armature itself could be provided with an opening for traversing the light exposure aperture 20. Although a blade mechanism has been described for use with the actuator 12, it will be appreciated that the actuator can drive other mechanisms as well.

Since certain changes may be made in the above-described apparatus without departing from the scope of the invention herein involved, it is intended that all matter contained in the description or shown in the accompanying drawings shall be interpreted as illustrative and not in a limiting sense.

What is claimed is:

1. An electromagnetic actuator comprising:

an armature assembly;

means for rotatably supporting said assembly for movement about a given axis;

conducting means operatively associated with one of said armature or said supporting means and being electrically energizable;

a permanent magnetic arrangement operatively associated with the other of said assembly or supporting means and being arranged adjacent to said conducting means, said arrangement establishes at least a permanent magnetic field offset from said axis and which encompasses at least a portion of said conducting means such that when the latter is energized with a given current polarity said assembly is driven in one direction about said axis; and, said arrangement, said conducting means and said assembly being constructed and arranged with respect to each other such that when said conducting means is energized generally opposing portions of said assembly develop force vectors which are generally equal in magnitude and opposite in direction generally throughout rotation of said assembly.

2. An electromagnetic actuator apparatus comprising:

an armature assembly;

means for rotatably supporting said assembly for rotational movement about a given axis;

conducting means operatively associated with one of said armature or said supporting means and being electrically energizable;

a permanent magnetic arrangement operatively associated with the other of said assembly or supporting means and being arranged in an adjacent relationship to said conducting means, said arrangement establishes at least a permanent magnetic field extending in the same general direction as said axis and which encompasses at least a portion of said conducting means such that when the latter is energized with a given current polarity said assembly is driven in one of two directions about said axis depending upon polarity of current; and, said arrangement, said conducting means and said assembly being constructed and arranged with respect to each other such that when said conducting means is energized with a given polarity generally opposing portions of said assembly develop force vectors which are generally equal in magnitude and opposite in direction so as to rotate said assembly about said axis wherein said force vectors remain substantially constant throughout rotation of said assembly.

3. The actuator of claim 3 further including means for controlling scene radiation by unblocking and blocking an optical path, said controlling means being connected to said assembly and movable in response to said assembly so as to unblock and block scene radiation traveling along the optical path, said scene radiation control means includes at least a pair of blades, each one of said blades is connected to a respective opposed end portion of said assembly, such that each of said blades is moved in the same direction as the respective opposed end portion it is connected to.

4. The actuator of claim 3 wherein said control means includes a common force transmitting member connected to and between said opposed end portions and having said blades connected thereto, and said control means includes means for defining a path of travel for said transmitting member including a pair of upper and lower flights which extend in respective planes generally parallel to said assembly, each of said blades being connected to respective ones of said flights such that both of said blades are arranged to cooperate with each other to selectively unblock and block the optical path during movement of said upper and lower flights.

5. The actuator of claim 4 wherein said blades extend in a plane generally transverse to the path of movement of said flights.

6. The actuator of claim 2 wherein said magnetic arrangement includes at least generally diametrically opposed pairs of permanent magnets, each of said pairs defines juxtaposed fields of opposite magnetic polarity extending generally transversely to the path of movement of said assembly, and said conducting means includes active conducting portions oriented so as to be generally parallel to said magnetic arrangement; each of said active conducting portions being associated with a respective one of said fields such that when energized electromagnetic driving forces are generated between each of said conducting portions and respective fields so that forces are created with generally equal and opposite force vectors so as rotate said assembly in said path.

7. The actuator of claim 6 wherein said active conducting portions form part of an integral generally flat coil assembly connected to said armature and are arranged in such a manner that when a current flows in a given direction in one of said portions associated with its respective field, the same current flows in the opposite direction in an adjacent one of said active conducting portions associated with its respective field in the same pair of fields.

8. The actuator of claim 4 wherein said opposed end portions are generally arcuate and have a generally constant radius, said upper and lower flights of said member having at least a flexible portion, such that when said armature assembly rotates said flexible portions of said member are wrapped and unwrapped from said arcuate portions in a manner such that they engage or disengage said arcuate portions at a point generally tangent to said radius, whereby said upper and lower flights can move in a rectilinear fashion.

9. An apparatus for use in an exposure control system of an image recordable device comprising:
an armature assembly;
means for rotatably supporting said assembly for movement about a given axis;
conducting means operatively associated with one of said armature or said supporting means and being electrically energizable;
a permanent magnetic arrangement operatively associated with the other of said assembly or supporting means and being arranged adjacent to said conducting means, said arrangement establishes at least a permanent magnetic field offset from said axis and which encompasses at least a portion of said conducting means such that when the latter is energized with a given current polarity said assembly is driven in one direction about said axis;
said arrangement, said conducting means and said assembly being constructed and arranged with respect to each other such that when said conducting means is energized generally opposing portions of said assembly develop force vectors which are generally equal in magnitude and opposite in direction so as to rotate said assembly; and,
means for controlling scene radiation by unblocking and blocking an optical path, said controlling means being connected to an armature assembly and movable in response to movement of said assembly so as to unblock and block scene radiation traveling along an optical path, said controlling means includes at least a pair of blades, each one of said blades is connected to a respective opposed end portion of said armature assembly, such that each of said blades is moved in the same direction as the respective opposed end portion it is connected to.

10. A blade mechanism comprising:
an armature assembly;
means for rotatably supporting said assembly for movement about an axis;
means for rotatably driving said assembly about said axis;
means for controlling scene radiation by unblocking and blocking an optical path, said controlling means being connected to said assembly and movable in response to said assembly so as to unblock and block scene radiation traveling along the optical path, said scene radiation control means includes at least a pair of blade assemblies each having a blade, each one of said blade assemblies is connected to a respective opposed end portion of said armature assembly such that each of said blade assemblies is moved in the same direction as the respective opposed end portion it is connected to, said control means includes means for defining upper and lower paths of travel respectively for each of said blades such that both of said blades are arranged to cooperate with each other to selectively unblock and block the optical path during movement along said upper and lower paths, said opposed end portions are generally arcuate and have a generally constant radius, each of said blade assemblies have at least a flexible portion, such that when said armature assembly rotates said flexible portions of said blade assemblies are wrapped and unwrapped from said arcuate portions in a manner such that they engage or disengage said arcuate portions at a point generally tangent to said radius, whereby said blades can move in rectilinear fashion along the upper and lower paths.

* * * * *